United States Patent [19]

Stull

[11] 3,890,016
[45] June 17, 1975

[54] BEARING CONSTRUCTION FOR IDLER ROLLS AND MAINTENANCE METHOD FOR IDLER ROLL BEARINGS

[75] Inventor: James T. Stull, Jackson Township, Butler County, Pa.

[73] Assignee: United States Steel Corporation, Pittsburgh, Pa.

[22] Filed: May 13, 1974

[21] Appl. No.: 469,263

[52] U.S. Cl. .................................. 308/1 R; 308/20
[51] Int. Cl. ........................................... F16c 13/00
[58] Field of Search ......... 308/20, 15, 1 R; 164/282

[56] References Cited
UNITED STATES PATENTS
3,633,655  1/1972  Hofmann ........................... 164/282
FOREIGN PATENTS OR APPLICATIONS
1,187,219  4/1970  United Kingdom ................... 308/20

Primary Examiner—M. Henson Wood, Jr.
Assistant Examiner—Gene A. Church
Attorney, Agent, or Firm—Walter P. Wood

[57] ABSTRACT

A bearing construction for idler rolls, and a maintenance method applicable to idler roll bearings, particularly useful for idler rolls which carry continuously cast strands in a multi-strand continuous-casting machine. The bearings are of softer metal than the roll necks, whereby wear takes place on the bearing surfaces, rather than on the roll necks. Wear on the bearing surfaces is concentrated within one lower quadrant of the central opening on the side toward which the load travels. The bearings are received in pillow blocks, but are shaped to be placed in four different positions within the pillow blocks throughout their life, whereby wear on each bearing is distributed among four areas. The different positions are obtained by inverting the bearings from their initial position within the pillow blocks, by turning them end-for-end, and by once more inverting them, or alternatively by rotating each bearing 90° in its pillow block each time it is re-positioned.

10 Claims, 7 Drawing Figures

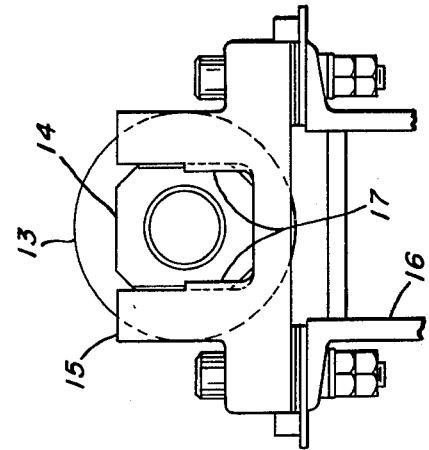
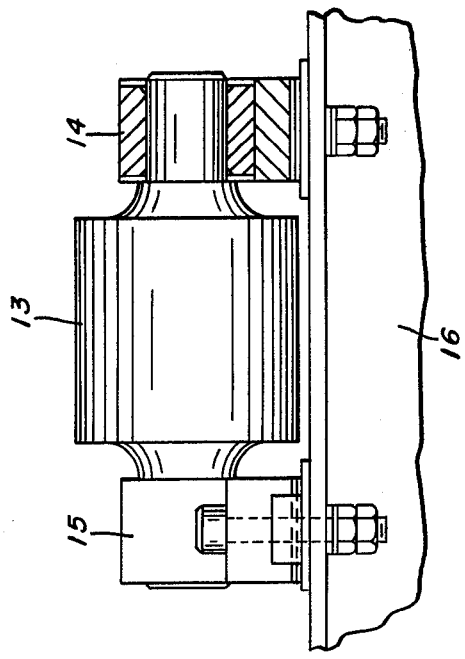
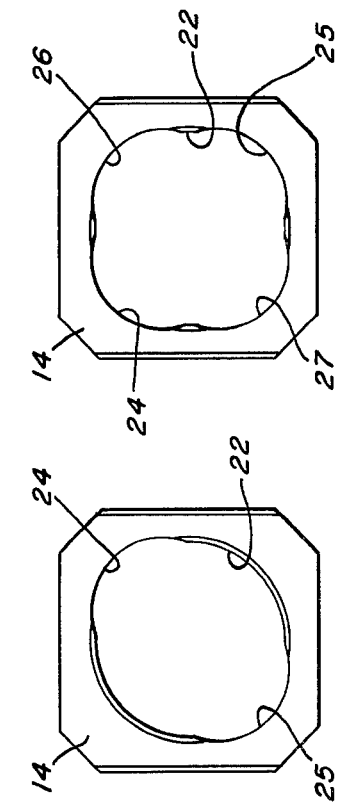
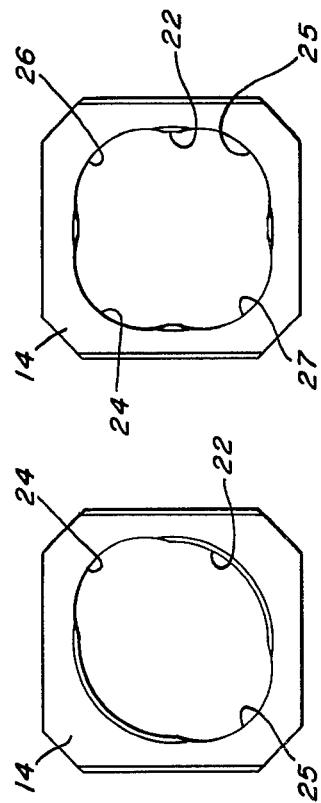
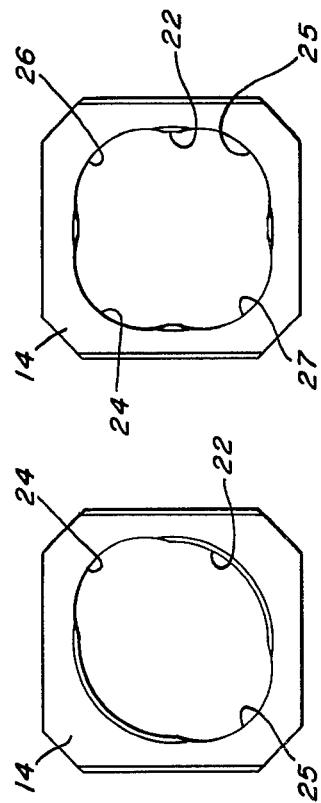
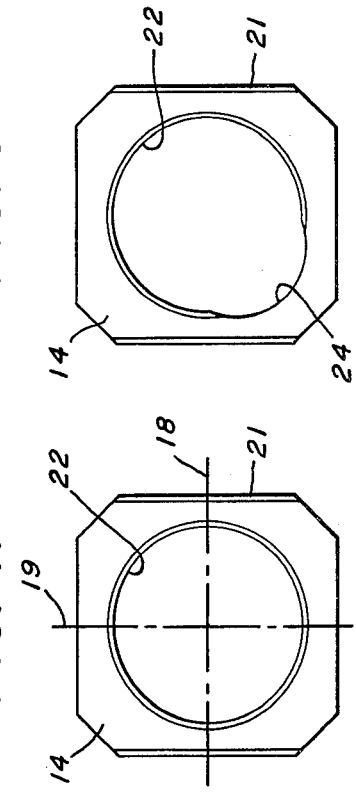

BEARING CONSTRUCTION FOR IDLER ROLLS AND MAINTENANCE METHOD FOR IDLER ROLL BEARINGS

This invention relates to an improved bearing construction for idler rolls and to an improved maintenance method applicable to idler roll bearings.

Although my invention is not thus limited, my bearing construction and maintenance method are particularly useful as applied to idler rolls which carry continuously cast metal strands in a multi-strand continuous-casting machine. In such machines it is desirable to arrange for the strands to travel in parallel paths with minimum spacing between strands. This arrangement leads to a problem that it is difficult to lubricate and maintain the bearings for the idler rolls which carry the newly cast strands. The strands are at a temperature of 1,700°F or higher and each bearing, except the two on the outside, is near two strands which are radiating heat. Under such conditions grease carburizes in the bearings. Various types of high-temperature greases have proved ineffective. Shielded grease liner also have proved to be difficult to keep in good order.

An object of my invention is to provide an improved bearing construction and maintenance method which overcome the foregoing problems.

A further object is to provide an improved bearing construction which avoids the need to lubricate the bearings and which enables each bearing to be re-positioned whenever it becomes worn in one position to four different positions throughout its life.

A further object is to provide an improved bearing construction in which each bearing is mounted in a respective pillow block, but can be easily pried out of its pillow block and re-inserted without need for removing and replacing nuts or other fastening means.

A further object is to provide an improved maintenance method applicable to idler roll bearings in which each bearing is re-positioned after it wears excessively in each position to four positions altogether, whereby bearing life is approximately quadrupled.

In the drawing:

FIG. 2 is a side elevational view, on a larger scale and with parts broken away, of one of the rolls shown in FIG. 1 and its bearings;

FIG. 3 is an end elevational view of the roll and bearing shown in FIG. 2;

FIG. 4 is an end elevational view of the bearing before and wear has taken place;

FIG. 5 is a view similar to FIG. 4, but showing the wear (exaggerated) which has taken place on the bearing after it has been used in its initial position;

FIG. 6 is another view similar to FIG. 4, but showing the wear which has taken place after the bearing has been used in its second position; and FIG. 7 is another view similar to FIG. 4, but showing the wear which has taken place after the bearing has been used in its fourth and final position.

Figure 1:
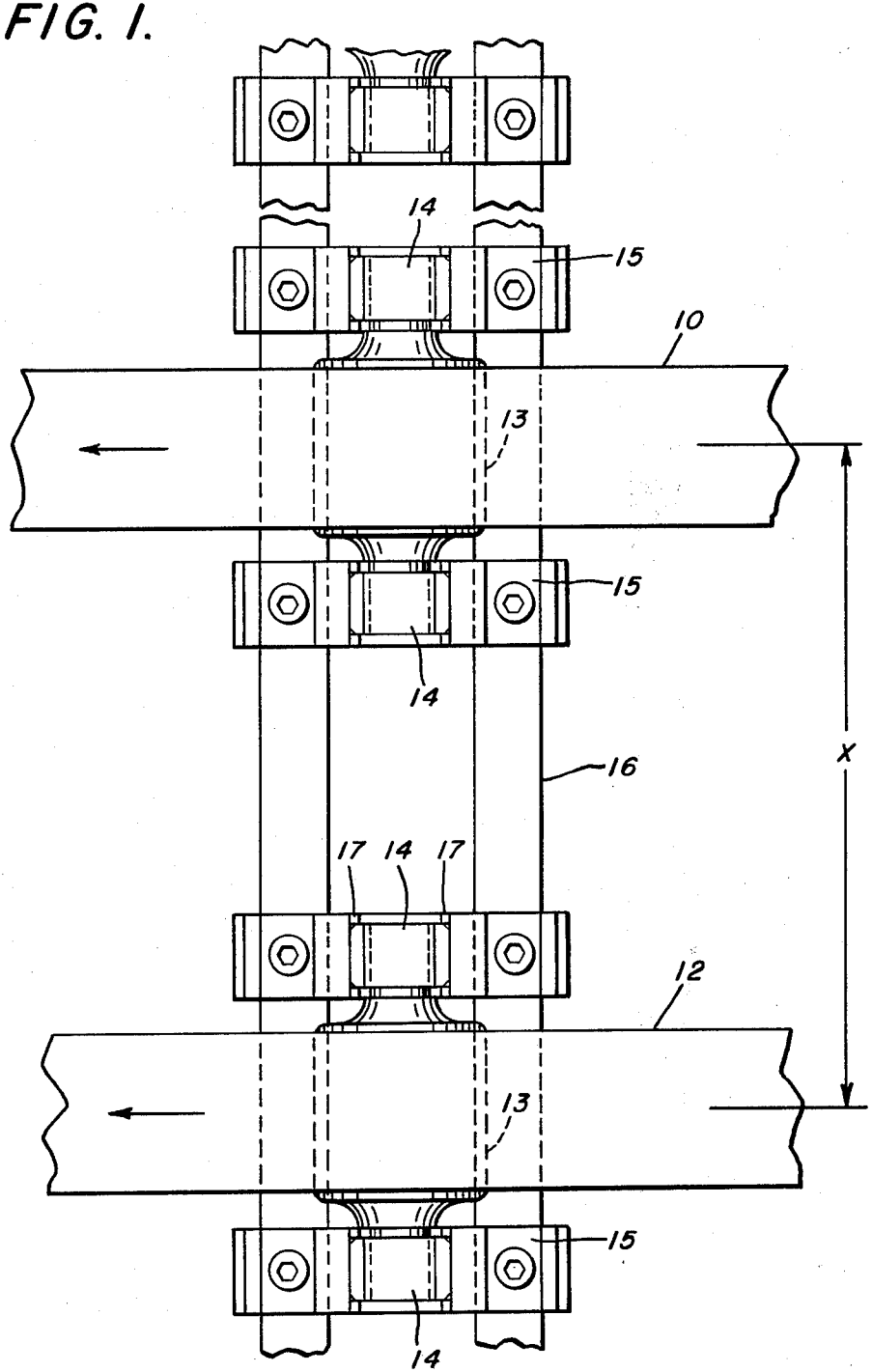
FIG. 1 is a top plan view of a portion of a multi-strand continuous-casting machine illustrating the relation of two strands and two rolls which carry them.

FIG. 1 shows portions of two metal strands 10 and 12 which have been newly cast in a multi-strand continuous-casting machine. The strands are at high temperatures, commonly at least 1,700°F, and they travel from right to left in parallel paths separated by only a short distance indicated at X. In one example, the strands may be billets 7 ½ inches x 7 ½ inches in cross section and their longitudinal center lines spaced 3 feet apart. The strands are supported on idler rolls 13 journaled in bearings 14 constructed in accordance with my invention.

The bearings 14 are of a metal such as bronze which does not require lubrication and is softer than the metal of the necks of rolls 13. Preferably the surfaces of the roll necks are specially hardened, for example by applying a submerged arc weld overlay or by carburizing or nitriding. Consequently wear takes place on the bearing surfaces, rather than on the roll necks, and the less costly bearings can be replaced after a period of use while the rolls remain serviceable much longer.

Each bearing 14 is mounted in a respective pillow block 15 bolted to frame members 16 beneath, as shown more clearly in FIGS. 2 and 3. The pillow blocks are open at the top and have inwardly projecting lips 17 along each edge of the opening, that is, four lips per pillow block. The lips are illustrated as extending upwardly from the bottom of the opening about half the height of the opening. The bearings 14 are slidably received between the lips. Each bearing is rectangular, with its corners truncated, when viewed in end elevation (FIGs. 4 to 7). The exterior shape of each bearing is symmetrical with respect to horizontal and vertical planes 18 and 19 respectively. The vertical edges of the bearings are chamfered, as indicated at 21. Each bearing has a central opening 22 which receives the neck of a roll 13 and initially is a true circle. The two bearings for any one roll have identical external dimensions and are interchangeable.

In use, the resultant force of a moving strand is transmitted through the roll necks to the surface of each bearing 14 at the lower quadrant of its central opening 22 on the side toward which the strand is traveling. Consequently wear on the bearing surface is concentrated at an area within this quadrant, that is, approximately at the 7-to-8-o'clock position as viewed in FIGS. 4 to 7. After each bearing undergoes a period of use in its initial position, its surface shows a worn spot 24 in this area, shown exaggerated in FIG. 5.

According to my maintenance method, when the first worn spot 24 becomes undesirably deep, I remove roll 13 and its bearings 14 from the pillow blocks 15, invert the bearings, and insert them again in the same pillow blocks. In this second position the area at which wear is concentrated lies diametrically opposite the first worn spot 24. After each bearing undergoes a period of use in its second position, its surface shows a second worn spot 25, shown exaggerated in FIG. 6. When the second worn spot becomes undesirably deep, I remove the roll and its bearings from the pillow blocks, turn them end-for-end, and insert the bearings in the pillow blocks at the opposite ends from their first and second positions. In this third position the area at which wear is concentrated lies intermediate the first and second worn spots 24 and 25, and the surface ultimately shows a third worn spot 26, shown exaggerated in FIG. 7. Finally I invert the bearings once more to a fourth position wherein the area at which wear is concentrated lies diametrically opposite the third worn spot 26. When the surface shows a fourth worn spot 27 which has become undesirably deep, I take the bearing out of service.

Each bearing can be pried out of its pillow block and re-inserted without need for removing and replacing nuts or other fastening means. In an ideal operation the casting machine is down for maintenance only one 8-hour turn per week. Hence it is an important advantage for the bearings to be quickly and easily changed in the limited time available.

As an alternative, I can make the vertical and horizontal dimensions of the end faces of the bearings equal and obtain the third and fourth positions of the bearings by rotating each bearing only 90° in its pillow block each time I re-position it. This alternative makes it unnecessary to turn the rolls and bearings end-for-end to obtain the third and fourth positions.

From the foregoing description it is seen that my invention provides a bearing construction which enables a bearing to be used in four different positions, whereby the wear is distributed among four areas through the life of the bearing. Thus the life of the bearing is approximately quadrupled over a bearing which is used in only a single position. This has proved to be an important advantage in unlubricated bearings which carry the idler rolls of a multi-strand continuous-casting machine. It is of course apparent that the sequence in which the bearing is used in its four positions can be varied without departing from my invention.

I claim:

1. In a combination which includes an idler roll, bearings having central openings in which said roll is journaled at each end, respective pillow blocks receiving said bearings, and means supporting said pillow blocks, and in which the surface of each bearing at which wear is concentrated lies within one quadrant of its central opening toward which the resultant force is applied as the roll carries a load, an improved construction in which said bearings have identical external dimensions, the exterior shape of each bearing being symmetrical with respect to horizontal and vertical planes, said pillow blocks having openings for receiving the bearings in four different positions, whereby the wear on the bearings is distributed among four areas through the life of the bearing.

2. An improvement as defined in claim 1 in which the four positions of said bearings are obtained by placing the bearings in an initial position, by inverting the bearings from their initial position, by turning said roll and bearings end-for-end from their initial position, and by once more inverting the bearings.

3. An improvement as defined in claim 1 in which the openings in said pillow blocks extend from the tops of the blocks, said pillow blocks have inwardly projecting lips at the edges of the openings therein, and said bearings are slidably received between said lips.

4. An improvement as defined in claim 1 in which the area of the bearing surface at which wear is concentrated lies within the lower quadrant of its central opening at the side toward which the load travels, and in which at the end of the life of the bearing a first worn spot is located in the surface initially occupying said area, a second worn spot is located diametrically opposite said first worn spot, and third and fourth worn spots are located intermediate said first and second worn spots diametrically opposite each other.

5. An improvement as defined in claim 1 in which said bearings are of a softer metal than the necks of said rolls, whereby wear takes place on the bearing surfaces rather than on the roll necks.

6. An improvement as defined in claim 5 in which said bearings are unlubricated.

7. In a multi-strand continuous-casting machine which includes a plurality of idler rolls defining parallel closely spaced paths of travel for a plurality of strands, bearings having central openings in which each of said rolls is journaled at each end, respective pillow blocks receiving said bearings, and means supporting said pillow blocks, and in which the surface of each bearing at which wear is concentrated lies within the lower quadrant of the central opening at the side toward which the strand travels, an improved bearing construction in which said bearings for any one roll have identical external dimensions, the exterior shape of each bearing being symmetrical with respect to horizontal and vertical planes, said pillow blocks having openings extending from their top for receiving the bearings in four different positions, whereby the wear on the bearings is distributed among four areas through the life of the bearing.

8. A machine as defined in claim 7 in which said bearings are unlubricated and are of a softer metal than the necks of said rolls, whereby wear takes place on the bearing surfaces rather than on the roll necks.

9. A method of maintaining bearings in which an idler roll is journaled and in which wear on the surface of the bearings is concentrated on one quadrant of the central opening of each toward which the resultant force is applied, said method comprising positioning said bearings throughout their life in four different positions by inverting the bearings from their initial position, or by turning the bearings end-for-end, whereby wear is distributed among four areas.

10. A method as defined in claim 9 in which the position of the bearings is changed as the surface shows undesirably deep worn spots, the second worn spot lying diametrically opposite the first, the third and fourth worn spots lying intermediate the first and second diametrically opposite each other.

* * * * *